(12) United States Patent
Borade et al.

(10) Patent No.: US 7,608,651 B2
(45) Date of Patent: *Oct. 27, 2009

(54) FLAME RETARDANT THERMOPLASTIC ARTICLE

(75) Inventors: Pravin Borade, Maharashtra (IN); Manatesh Chakraborty, Mumbai (IN); Anantharaman Dhanabalan, Bangalore (IN); Roshan Kumar Jha, Bangalore (IN); Jaykisor Pal, West Bengal (IN)

(73) Assignee: Sabic Innovative Plastics IP B.V. (NL)

( * ) Notice: Subject to any disclaimer, the term of this patent is extended or adjusted under 35 U.S.C. 154(b) by 388 days.

This patent is subject to a terminal disclaimer.

(21) Appl. No.: 11/279,148

(22) Filed: Apr. 10, 2006

(65) Prior Publication Data

US 2006/0167144 A1    Jul. 27, 2006

Related U.S. Application Data

(63) Continuation-in-part of application No. 11/271,279, filed on Nov. 11, 2005, and a continuation-in-part of application No. 11/271,278, filed on Nov. 11, 2005, and a continuation-in-part of application No. 10/994,769, filed on Nov. 22, 2004.

(51) Int. Cl.
*C08K 5/5313* (2006.01)
(52) U.S. Cl. ........................... 524/126; 524/133
(58) Field of Classification Search ................ 524/126, 524/133; 264/176.1
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 5/1943 | Hanford | |
| 2,512,606 A | 6/1950 | Bolton et al. | |
| 3,379,792 A | 4/1968 | Finholt | |
| 4,200,707 A | 4/1980 | Richardson et al. | |
| 4,772,664 A | 9/1988 | Ueda et al. | |
| 4,863,996 A | 9/1989 | Nskazima et al. | |
| 4,970,272 A | 11/1990 | Gallucci | |
| 5,071,894 A | 12/1991 | Weil et al. | |
| 5,132,365 A | 7/1992 | Gallucci | |
| 5,326,805 A | 7/1994 | Sicken et al. | |
| 5,468,530 A * | 11/1995 | Gotz et al. | ................ 428/36.4 |
| 5,535,600 A | 7/1996 | Mills | |
| 5,543,452 A | 8/1996 | Nakashi et al. | |
| 5,714,550 A | 2/1998 | Shaw | |
| 5,741,846 A | 4/1998 | Lohmeijer | |
| 5,760,132 A | 6/1998 | McGaughan et al. | |
| 5,843,340 A | 12/1998 | Silvi et al. | |
| 6,111,016 A | 8/2000 | Katayama et al. | |
| 6,166,115 A | 12/2000 | Landa | |
| 6,207,736 B1 | 3/2001 | Nass et al. | |
| 6,255,371 B1 | 7/2001 | Schlosser et al. | |
| 6,284,830 B1 | 9/2001 | Gottschalk et al. | |
| 6,344,158 B1 | 2/2002 | Schlosser | |
| 6,365,071 B1 | 4/2002 | Jenewin et al. | |
| 6,384,128 B1 | 5/2002 | Wadahara et al. | |
| 6,414,084 B1 | 7/2002 | Adedeji | |
| 6,423,768 B1 * | 7/2002 | Khouri | ...................... 524/445 |
| 6,503,969 B1 | 1/2003 | Klatt et al. | |
| 6,509,401 B1 | 1/2003 | Jenewein et al. | |
| 6,547,992 B1 | 4/2003 | Schlosser et al. | |
| 6,558,764 B2 | 5/2003 | Blom et al. | |
| 6,569,974 B1 | 5/2003 | Sicken et al. | |
| 6,576,700 B2 | 6/2003 | Patel | |
| 6,583,315 B2 | 7/2003 | Dewa | |
| 6,593,411 B2 | 7/2003 | Koevoets et al. | |
| 6,599,446 B1 | 7/2003 | Todt et al. | |
| 6,600,068 B2 | 7/2003 | Sicken et al. | |
| 6,630,526 B2 | 10/2003 | Heinen et al. | |
| 6,767,941 B2 | 7/2004 | Van Der Spek et al. | |
| 6,887,930 B2 | 5/2005 | Uchida et al. | |
| 7,205,346 B2 * | 4/2007 | Harashina | ................... 524/133 |
| 2001/0007888 A1 | 7/2001 | Asano et al. | |
| 2003/0073865 A1 | 4/2003 | Sicken et al. | |
| 2003/0166762 A1 | 9/2003 | Koevoets et al. | |
| 2003/0176543 A1 | 9/2003 | Patel | |
| 2003/0216533 A1 | 11/2003 | Sicken et al. | |
| 2004/0049063 A1 | 3/2004 | Hoerold et al. | |
| 2005/0075427 A1 | 4/2005 | Campbell et al. | |
| 2005/0250885 A1 * | 11/2005 | Mercx et al. | .................. 524/99 |
| 2006/0058432 A1 * | 3/2006 | Perego et al. | ............... 524/115 |
| 2006/0167143 A1 | 7/2006 | Borade et al. | |

FOREIGN PATENT DOCUMENTS

| | | |
|---|---|---|
| EP | 0183195 | 11/1985 |
| EP | 0332965 | 6/1989 |
| EP | 0332965 | 9/1989 |
| EP | 0501175 | 3/1992 |
| EP | 0657498 | 6/1995 |

(Continued)

OTHER PUBLICATIONS

International Search Report for International Application No. PCT/US2007/006949, mailed Aug. 22, 2007, 6 pages.
Written Opinion for International Search Report for International Application No. PCT/US2007/006949, mailed Aug. 22, 2007, 6 pages.

(Continued)

*Primary Examiner*—Peter Szekely
(74) *Attorney, Agent, or Firm*—Cantor Colburn LLP

(57) ABSTRACT

An article comprises a compatibilized poly(arylene ether)/polyamide blend, an optional electrically conductive filler, a phosphinate, and flame retardant augment selected from the group consisting of melamine polyphosphate, zinc borate, low melting glass, talc, and combinations of two or more of the foregoing flame retardant augments.

25 Claims, No Drawings

FOREIGN PATENT DOCUMENTS

| | | |
|---|---|---|
| EP | 0699708 | 8/1995 |
| EP | 1522551 | 4/2005 |
| JP | 2005364323 | 7/2007 |
| JP | 2006308441 | 7/2007 |
| JP | 2006308442 | 7/2007 |
| WO | 9957187 | 11/1999 |
| WO | 0228953 | 4/2002 |
| WO | 2005017042 | 2/2005 |
| WO | 2005118698 | 12/2005 |
| WO | 2006055732 | 5/2006 |

OTHER PUBLICATIONS

UL94 "Tests for Flammability of Plastic Materials for Parts in Devices and Appliances" 40 pages.

Japanese patent No. JP 2000-212434 published Aug. 2, 2000, abstract only.

U.S. Appl. No. 10/994,769, Fishburn, filed Nov. 22, 2004.

U.S. Appl. No. 11/271,279, Elkovitch et al. filed Nov. 11, 2005.

U.S. Appl. No. 11/271,278, Elkovitch et al. filed Nov. 11, 2005.

U.S. Appl. No. 11/279,143, Borade et al. filed Apr. 10, 2006.

International Search Report PCT/US/2005/041724.

WO 2007/055147; published May 18, 2007; Human Translation; 43 pages.

WO2007/058169; published May 24, 2007; Human Translation; 58 pages.

WO 2007/058170; published May 24, 2007; Human Translation; 54 pages.

S. Horold et al., "A New Generation of Flame Retarded Polyamides Based on Phosphinates", 7 pages http://ec.europa.eu/environment/waste/stakeholders/individual_bus/clariant/att_2.pdf, printed Feb. 6, 2007.

* cited by examiner

FLAME RETARDANT THERMOPLASTIC ARTICLE

CROSS-REFERENCE TO RELATED APPLICATIONS

This application is a continuation-in-part of U.S. patent application Ser. No. 10/994,769 filed on Nov. 22, 2004 and U.S. patent application Ser. Nos. 11/271,279 and 11/271,278, filed on Nov. 11, 2005, all of which are incorporated by reference herein in their entirety.

BACKGROUND OF INVENTION

This invention relates to a flame retardant system and to its use in thermoplastic polymers.

Poly(arylene ether) resins have been blended with polyamide resins to provide compositions having a wide variety of beneficial properties such as heat resistance, chemical resistance, impact strength, hydrolytic stability and dimensional stability.

These beneficial properties are desirable in a wide variety of applications and the shapes and sizes of the parts required for these applications vary widely. As a result there is a variety of forming or molding methods employed such as injection molding, compression molding and extrusion. In addition, it is desirable for thermoplastic compositions to be flame retardant in many applications.

In the past, flame retardancy was typically achieved through the use of halogen containing flame retardants. Halogen containing flame retardants have gradually been supplanted by organophosphate ester flame retardants in some applications. Phosphinates have been suggested as an alternative to organophosphate ester flame retardants. However, the use of phosphinates as flame retardants in thermoplastic polymers does not always lead to the desired combination of physical properties and flame retardance. Accordingly, a need remains for phosphinate flame retardant system and a flame retardant thermoplastic composition comprising a phosphinates as we as articles comprising the flame retardant thermoplastic composition.

BRIEF DESCRIPTION OF THE INVENTION

An article comprising a flame retardant composition comprising a compatibilized poly(arylene ether)/polyamide blend, an electrically conductive filler, a phosphinate, and a flame retardant augment selected from the group consisting of melamine polyphosphate, zinc borate, low melting glass, talc, and combinations of two or more of the foregoing flame retardant augments.

In another embodiment, an article comprises a flame retardant composition comprising a compatibilized poly(arylene ether)/polyamide blend, a phosphinate, and a flame retardant augment selected from the group consisting of melamine polyphosphate, zinc borate, low melting glass, titanium dioxide, talc, and combinations of two or more of the foregoing flame retardant augments.

DETAILED DESCRIPTION

The terms "first," "second," and the like, "primary," "secondary," and the like, as used herein do not denote any order, quantity, or importance, but rather are used to distinguish one element from another.

The terms "a" and "an" do not denote a limitation of quantity, but rather denote the presence of at least one of the referenced items.

"Optional" or "optionally" means that the subsequently described event or circumstance may or may not occur, and that the description includes instances where the event occurs and instances where it does not.

The flame retardant compositions described herein have a flame retardancy rating of V-1 or better according to Underwriter's Laboratory Bulletin 94 entitled "Tests for Flammability of Plastic Materials, UL94" (UL94) (Dec. 12, 2003 revision) at a thickness of 2.0 millimeters (mm). The flame retardancy is achieved with an amount of phosphinate that is significantly lower (50% or more by weight) than would be required if the phosphinate was used without a flame retardant augment. The flame retardant augment is used in a small amount, typically 0.1 to 6.0 weight percent based on the total weight of the composition. In some embodiments a flame retardancy rating of V-1 or better can be obtained using a total combined amount of phosphinate and flame retardant augment that is less than the amount of phosphinate alone that would be required to achieve a comparable flame retardant rating.

In some embodiments the composition is suitable for use in low pressure/low shear molding processes. Low pressure/low shear molding processes require materials with a melt strength sufficiently high and a melt volume rate (MVR) sufficiently low to maintain the desired shape after leaving the extrusion die or mold.

In some embodiments, it is desirable for the materials to be sufficiently electrically conductive to permit electrostatic coating. One common indicator for conductivity is specific volume resistivity. Specific volume resistivity (SVR) is a measure of the leakage current through a volume of material. It is defined as the electrical resistance through a one-centimeter cube of material and is expressed in ohm-cm. The lower the specific volume resistivity of a material, the more conductive the material is. In one embodiment the composition has a specific volume resistivity less than or equal to $10^6$ ohm-cm, or, more specifically, less than or equal to $10^5$ ohm-cm, or, even more specifically, less than or equal to $10^4$ ohm-cm. The composition can have a specific volume resistivity greater than or equal to 1 ohm-cm. Specific volume resistivity may be determined as described in the Examples.

The inclusion of one or more of the flame retardant augments with a reduced amount of phosphinate results in a composition that achieves comparable specific volume resistivity relative to a comparable composition having no flame retardant augment and a higher amount of phosphinate. As a result it is possible to achieve the same or lower resistivity in a composition comprising lower amount of phosphinate, flame retardant augment(s), and electrically conductive filler than in a composition comprising electrically conductive filler and a higher amount of phosphinate but no flame retardant augment. This is surprising as it has been previously suggested that phosphinates can enhance conductivity and the reduction in the amount of phosphinate by 50% or more would be expected to increase the SVR.

The terms "a" and "an" herein do not denote a limitation of quantity, but rather denote the presence of at least one of the referenced item. All ranges disclosed herein are inclusive and combinable (e.g., ranges of "less than or equal to 25 wt %, or, more specifically, 5 wt % to 20 wt %," is inclusive of the endpoints and all intermediate values of the ranges of "5 wt % to 25 wt %," etc.).

As used herein, a "poly(arylene ether)" comprises a plurality of structural units of the formula (I):

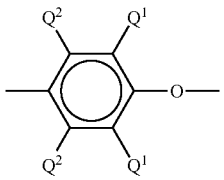

(I)

wherein for each structural unit, each $Q^1$ and each $Q^2$ is independently hydrogen, halogen, primary or secondary lower alkyl (e.g., an alkyl containing 1 to 7 carbon atoms), haloalkyl, aminoalkyl, alkenylalkyl, alkynylalkyl, aryl (e.g., phenyl), hydrocarbonoxy, and halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are end groups resulting from backward dimer incorporation during the manufacture of the poly(arylene ether), e.g., tetramethyl diphenylquinone (TMDQ), when 2,6-xylenol is used as a monomer.

The poly(arylene ether) may be in the form of a homopolymer; a copolymer; a graft copolymer; an ionomer; a block copolymer, for example comprising arylene ether units and blocks derived from alkenyl aromatic compounds; as well as combinations comprising at least one of the foregoing. Poly(arylene ether) includes polyphenylene ether comprising 2,6-dimethyl 1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese, or cobalt compound, usually in combination with various other materials such as a secondary amine, tertiary amine, halide or combination of two or more of the foregoing.

The poly(arylene ether) can have a number average molecular weight of 3,000 to 40,000 grams per mole (g/mol), a weight average molecular weight of 5,000 to 80,000 g/mol, or a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) can have an initial intrinsic viscosity of 0.10 to 0.60 deciliters per gram (dl/g), or, more specifically, 0.29 to 0.48 dl/g, as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the intrinsic viscosity of the poly(arylene ether) may be up to 30% higher after melt mixing. The percentage of increase can be calculated by (final intrinsic viscosity−initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

In one embodiment the poly(arylene ether) has a glass transition temperature (Tg) as determined by differential scanning calorimetry in a nitrogen atmosphere (DSC at 20° C./minute ramp), of 160° C. to 250° C. The Tg is determined based upon the results of the second of two heating cycles. Within this range the Tg may be greater than or equal to 180° C., or, more specifically, greater than or equal to 200° C. Also within this range the Tg may be less than or equal to 240° C., or, more specifically, less than or equal to 230° C.

The composition comprises poly(arylene ether) in an amount such that the poly(arylene ether) is present as a dispersed or co-continuous phase. Poly(arylene ether) can be present in an amount of 15 to 65 weight percent. Within this range, the poly(arylene ether) may be present in an amount greater than or equal to 20 weight percent, or, more specifically, in an amount greater than or equal to 25 weight percent, or, even more specifically, in an amount greater than or equal to 30 weight percent. Also within this range the poly(arylene ether) may be present in an amount less than or equal to 60 weight percent, or, more specifically, less than or equal to 55 weight percent, or, even more specifically, less than or equal to 50 weight percent. Weight percent is based on the total weight of the thermoplastic composition.

Polyamide resins, also known as nylons, are characterized by the presence of an amide group (—C(O)NH—), and are described in U.S. Pat. No. 4,970,272. Exemplary polyamide resins include, but are not limited to, nylon-6; nylon-6,6; nylon-4; nylon-4,6; nylon-12; nylon-6,10; nylon-6,9; nylon-6,12; amorphous polyamides; polyphthalamides, nylon-6/6T and nylon-6,6/6T with triamine contents below 0.5 weight percent; nylon-9T; and combinations of polyamides. In one embodiment, the polyamide resin comprises nylon-6 and nylon-6,6. In one embodiment the polyamide resin or combination of polyamide resins has a melting point (Tm) greater than or equal to 171° C. When the polyamide comprises a super tough polyamide, i.e. a rubber-toughened polyamide, the composition may or may not contain a separate impact modifier.

Polyamide resins may be obtained by a number of well known processes such as those described in U.S. Pat. Nos. 2,071,250; 2,071,251; 2,130,523; 2,130,948; 2,241,322; 2,312,966; 2,512,606; 6,887,930; and JP 2000-212434. Polyamide resins are commercially available from a wide variety of sources.

In some embodiments, polyamide resins having an intrinsic viscosity of up to 400 milliliters per gram (ml/g) can be used, or, more specifically, having a viscosity of 90 to 350 ml/g, or, even more specifically, having a viscosity of 110 to 240 ml/g, as measured in a 0.5 weight percent (wt %) solution in 96 wt % sulfuric acid in accordance with ISO 307.

In some embodiments, the polyamide may have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt % solution in 96 wt % sulfuric acid.

In one embodiment, the polyamide resin comprises a polyamide having an amine end group concentration greater than or equal to 35 microequivalents amine end group per gram of polyamide (μeq/g) as determined by titration with HCl. Within this range, the amine end group concentration may be greater than or equal to 40 μeq/g, or, more specifically, greater than or equal to 45 μeq/g. The maximum amount of amine end groups is typically determined by the polymerization conditions and molecular weight of the polyamide.

Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution and the weight of the polyamide sample.

In one embodiment, the polyamide comprises greater than or equal to 50 weight percent of the total weight of the polyamide, of a polyamide having a melting temperature within 35%, or more specifically within 25%, or, even more specifically, within 15% of the glass transition temperature (Tg) of the poly(arylene ether). As used herein having a melting temperature within 35% of the glass transition temperature of the polyarylene ether is defined as having a melting temperature that is greater than or equal to (0.65× Tg of the poly (arylene ether)) and less than or equal to (1.35× Tg of the poly(arylene ether)).

The composition comprises polyamide in an amount sufficient to form a continuous or co-continuous phase of the composition. The amount of polyamide can be 30 to 85 weight percent. Within this range, the polyamide may be present in an amount greater than or equal to 33 weight percent, or, more specifically, in an amount greater than or equal to 38 weight percent, or, even more specifically, in an amount greater than or equal to 40 weight percent. Also within this range, the polyamide may be present in an amount less than or equal to 60 weight percent, or, more specifically, less than or equal to 55 weight percent, or, even more specifically, less than or equal to 50 weight percent. Weight percent is based on the total weight of the thermoplastic composition.

When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/ polyamide blend" refers to those compositions which have been physically and/or chemically compatibilized with an agent as discussed above, as well as those compositions which are physically compatible without such agents, as taught in U.S. Pat. No. 3,379,792.

As understood by one of ordinary skill in the art, poly (arylene ether) and polyamide, when combined, form an immiscible blend. Immiscible blends have either a continuous phase and a dispersed phase or two co-continuous phases. When a continuous phase and a dispersed phase are present the size of the particles of the dispersed phase can be determined using electron microscopy. In a compatibilized poly (arylene ether)/polyamide blend the average diameter of the dispersed phase particles (poly(arylene ether)) is decreased compared to non-compatibilized poly(arylene ether)/polyamide blends. For example, compatibilized poly(arylene ether)/polyamide blends have an average poly(arylene ether) particle diameter less than or equal to 10 micrometers. In some embodiments the average particle diameter is greater than or equal to 0.05 Micrometers. The average particle diameter in a pelletized blend may be smaller than in a molded article but in either case the average particle diameter is less than or equal to 10 micrometers. Determination of average particle diameter is known in the art and is taught, for example, in U.S. Pat. Nos. 4,772,664 and 4,863,996.

Examples of the various compatibilizing agents that may be employed include: liquid diene polymers, epoxy compounds, oxidized polyolefin wax, quinones, organosilane compounds, polyfunctional compounds, functionalized poly (arylene ether) and combinations comprising at least one of the foregoing. Compatibilizing agents are further described in U.S. Pat. Nos. 5,132,365 and 6,593,411 as well as U.S. Patent Application No. 2003/0166762.

In one embodiment, the compatibilizing agent comprises a polyfunctional compound. Polyfunctional compounds which may be employed as a compatibilizing agent are of three types. The first type of polyfunctional compounds are those having in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g., acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is 5 to 30); unsaturated amines resulting from replacing the —OH group(s) of the above unsaturated alcohols with $NH_2$ groups; functionalized diene polymers and copolymers; and combinations comprising one or more of the foregoing. In one embodiment, the compatibilizing agent comprises maleic anhydride, fumaric acid or a combination of maleic anhydride and fumaric acid.

The second type of polyfunctional compatibilizing agents are characterized as having both (a) a group represented by the formula (OR) wherein R is hydrogen or an alkyl, aryl, acyl, or carbonyl dioxy group and (b) at least two groups each of which may be the same or different selected from carboxylic acid, acid halide, anhydride, acid halide anhydride, ester, orthoester, amide, imido, amino, and various salts thereof. Some examples of this group of compatibilizers are the aliphatic polycarboxylic acids, acid esters and acid amides represented by the formula:

$$(R^IO)_m R^V (COOR^{II})_n (CONR^{III}R^{IV})_s$$

wherein $R^V$ is a linear or branched chain, saturated aliphatic hydrocarbon having 2 to 20, or, more specifically, 2 to 10, carbon atoms; $R^1$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polyfunctional compatibilizing agents of the second type also include, for example, citric acid, malic acid, agaricic acid; including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, mono- and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivates include the salts thereof, including the salts with amines and the alkali and alkaline metal salts. Exemplary of suitable salts include calcium malate, calcium citrate, potassium malate, and potassium citrate.

The third type of polyfunctional compatibilizing agents are characterized as having in the molecule both (a) an acid halide group and (b) at least one carboxylic acid, anhydride, ester, epoxy, orthoester, or amide group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The flame retardant thermoplastic composition is produced by melt blending. The components and the foregoing compatibilizing agents may be added directly to the melt blend or pre-reacted with either or both of the poly(arylene ether) and polyamide, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize all or part of the poly(arylene ether). For example, the poly(arylene ether) may be allowed to pre-react with maleic anhydride to form an anhydride functionalized poly(arylene ether) which when melt blended with polyamide and optionally unreacted poly(arylene ether) results in a compatibilized poly(arylene ether)/polyamide blend.

Where the compatibilizing agent is employed in the preparation of the compositions, the amount used will be dependent upon the specific compatibilizing agent chosen and the specific polymeric system to which it is added as well as the desired properties of the resultant composition.

The composition may comprise an impact modifier. Impact modifiers can be block copolymers containing alkenyl aromatic repeating units, for example, A-B diblock copolymers and A-B-A triblock copolymers having of one or two alkenyl aromatic blocks A (blocks having aryl alkylene repeating units), which are typically styrene blocks, and a rubber block, B, which is typically an isoprene or butadiene block. The butadiene block may be partially or completely hydrogenated. Mixtures of these diblock and triblock copolymers may also be used as well as mixtures of non-hydrogenated copolymers, partially hydrogenated copolymers, fully hydrogenated copolymers and combinations of two or more of the foregoing.

A-B and A-B-A copolymers include, but are not limited to, polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. Such A-B and A-B-A block copolymers are available commercially from a number of sources, including Phillips Petroleum under the trademark SOLPRENE, KRATON Polymers, under the trademark KRATON, Dexco under the trademark VECTOR, Asahi Kasai under the trademark TUFTEC, Total Petrochemicals under the trademarks FINAPRENE and FINACLEAR and Kuraray under the trademark SEPTON.

In one embodiment, the impact modifier comprises polystyrene-poly(ethylene-butylene)-polystyrene, polystyrene-poly(ethylene-propylene), or a combination of the foregoing.

Another type of impact modifier is essentially free of aryl alkylene repeating units and comprises one or more moieties selected from the group consisting of carboxylic acid, anhydride, epoxy, oxazoline, and ester. Essentially free is defined as having alkenyl aromatic unit present in an amount less than 5 weight percent, or, more specifically, less than 3 weight percent, or, even more specifically less than 2 weight percent, based on the total weight of the block copolymer. When the impact modifier comprises a carboxylic acid moiety the carboxylic acid moiety may be neutralized with an ion, specifically a metal ion such as zinc or sodium. It may be an alkylene-alkyl (meth)acrylate copolymer and the alkylene groups may have 2 to 6 carbon atoms and the alkyl group of the alkyl (meth)acrylate may have 1 to 8 carbon atoms. This type of polymer can be prepared by copolymerizing an olefin, for example, ethylene and propylene, with various (meth)acrylate monomers and/or various maleic-based monomers. The term (meth)acrylate refers to both the acrylate as well as the corresponding methacrylate analogue. Included within the term (meth)acrylate monomers are alkyl (meth)acrylate monomers as well as various (meth)acrylate monomers containing at least one of the aforementioned reactive moieties.

In a one embodiment, the impact modifier is derived from ethylene, propylene, or mixtures of ethylene and propylene, as the alkylene component; butyl acrylate, hexyl acrylate, or propyl acrylate as well as the corresponding alkyl (methyl) acrylates, for the alkyl (meth)acrylate monomer component, with acrylic acid, maleic anhydride, glycidyl methacrylate or a combination thereof as monomers providing the additional reactive moieties (i.e., carboxylic acid, anhydride, epoxy).

Exemplary impact modifiers are commercially available from a variety of sources including ELVALOY, SURLYN, and FUSABOND, all of which are available from DuPont.

The aforementioned impact modifiers can be used singly or in combination.

The composition may comprise an impact modifier or a combination of impact modifiers, in an amount of 1 to 15 weight percent. Within this range, the impact modifier may be present in an amount greater than or equal to 1.5 weight percent, or, more specifically, in an amount greater than or equal to 2 weight percent, or, even more specifically, in an amount greater than or equal to 3 weight percent. Also within this range, the impact modifier may be present in an amount less than or equal to 13 weight percent, or, more specifically, less than or equal to 12 weight percent, or, even more specifically, less than or equal to 10 weight percent. Weight percent is based on the total weight of the thermoplastic composition.

In some embodiments the composition comprises an electrically conductive filler. The electrically conductive filler may comprise electrically conductive carbon black, carbon nanotubes, carbon fibers or a combination of two or more of the foregoing. Electrically conductive carbon blacks are commercially available and are sold under a variety of trade names, including but not limited to S.C.F. (Super Conductive Furnace), E.C.F. (Electric Conductive Furnace), KETJEN-BLACK EC (available from Akzo Co., Ltd.), PRINTEX XE2B (available from Degussa), ENSACO 350G (available from Timcal), or acetylene black. In some embodiments the electrically conductive carbon black has an average particle size less than or equal to 200 nanometers (nm), or, more specifically, less than or equal to 100 nm, or, even more specifically, less than or equal to 50 nm. The electrically conductive carbon blacks may also have surface areas greater than 200 square meter per gram ($m^2/g$), or, more specifically, greater than 400 $m^2/g$, or, even more specifically, greater than 900 $m^2/g$ as determined by BET analysis. The electrically conductive carbon black may have a pore volume greater than or equal to 40 cubic centimeters per hundred grams ($cm^3/100$ g), or, more specifically, greater than or equal to 100 $cm^3/100$ g, or, even more specifically, greater than or equal to 150 $cm^3/100$ g, as determined by dibutyl phthalate absorption.

Carbon nanotubes that can be used include single wall carbon nanotubes (SWNTs), multiwall carbon nanotubes (MWNTs), vapor grown carbon fibers (VGCF) and combinations comprising two or more of the foregoing.

Single wall carbon nanotubes (SWNTs) may be produced by laser-evaporation of graphite, carbon arc synthesis or a high-pressure carbon monoxide conversion process (HIPCO) process. These SWNTs generally have a single wall comprising a graphene sheet with outer diameters of 0.7 to 2.4 nanometers (nm). The SWNTs may comprise a mixture of metallic SWNTs and semi-conducting SWNTs. Metallic SWNTs are those that display electrical characteristics similar to metals, while the semi-conducting SWNTs are those that are electrically semi-conducting. In some embodiments it is desirable to have the composition comprise as large a fraction of metallic SWNTs as possible, SWNTs may have aspect ratios of greater than or equal to 5, or, more specifically, greater than or equal to 100, or, even more specifically, greater than or equal to 1000. While the SWNTs are generally closed structures having hemispherical caps at each end of the respective tubes, it is envisioned that SWNTs having a single open end or both open ends may also be used. The SWNTs generally comprise a central portion, which is hollow, but may be filled with amorphous carbon.

In one embodiment the SWNTs comprise metallic nanotubes in an amount of greater than or equal to 1 wt %, or, more specifically, greater than or equal to 20 wt %, or, more specifically, greater than or equal to 30 wt %, or, even more specifically greater than or equal to 50 wt %, or, even more specifically, greater than or equal to 99.9 wt % of the total weight of the SWNTs.

In one embodiment the SWNTs comprise semi-conducting nanotubes in an amount of greater than or equal to 1 wt %, or, more specifically, greater than or equal to 20 wt %, or, more specifically, greater than or equal to 30 wt %, or, even more specifically, greater than or equal to 50 wt %, or, even more specifically, greater than or equal to 99.9 wt % of the total weight of the SWNTs.

MWNTs may be produced by processes such as laser ablation and carbon arc synthesis. MWNTs have at least two graphene layers bound around an inner hollow core. Hemispherical caps generally close both ends of the MWNTs, but it is also possible to use MWNTs having only one hemispherical cap or MWNTs which are devoid of both caps. MWNTs generally have diameters of 2 to 50 nm. Within this range, the MWNTs may have an average diameter less than or equal to 40, or, more specifically, less than or equal to 30, or, even more specifically less than or equal to 20 run. MWNTs may have an average aspect ratio greater than or equal to 5, or, more specifically, greater than or equal to 100, or, even more specifically greater than or equal to 1000.

In one embodiment, the MWNT comprises vapor grown carbon fibers (VGCF). VGCF are generally manufactured in a chemical vapor deposition process. VGCF leaving "tree-ring" or "fishbone" structures may be grown from hydrocarbons in the vapor phase, in the presence of particulate metal catalysts at moderate temperatures, i.e., 800 to 1500° C. In the "tree-ring" structure a multiplicity of substantially graphitic sheets are coaxially arranged about the core. In the "fishbone" structure, the fibers are characterized by graphite layers extending from the axis of the hollow core.

VGCF having diameters of 3.5 to 2000 nanometers (nm) and aspect ratios greater than or equal to 5 may be used. VGCF may have diameters of 3.5 to 500 nm, or, more specifically 3.5 to 100 nm, or, even more specifically 3.5 to 50 nm. VGCF may have an average aspect ratios greater than or equal to 100, or, more specifically, greater than or equal to 1000.

Various types of conductive carbon fibers may also be used in the composition. Carbon fibers are generally classified according to their diameter, morphology, and degree of graphitization (morphology and degree of graphitization being interrelated). These characteristics are presently determined by the method used to synthesize the carbon fiber. For example, carbon fibers having diameters down to 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch.

The carbon fibers generally have a diameter of greater than or equal to 1,000 nanometers (1 micrometer) to 30 micrometers. Within this range fibers having sizes of greater than or equal to 2, or, more specifically, greater than or equal to 3, or, more specifically greater than or equal to 4 micrometers may be used. Also within this range fibers having diameters of less than or equal to 25, or, more specifically, less than or equal to 15, or, even more specifically less than or equal to 11 micrometers may be used.

The composition may comprise a sufficient amount of electrically conductive filler to achieve a specific volume resistivity less than or equal to $10^6$ ohm-cm. For example, the composition may comprise electrically conductive carbon black, carbon fibers, carbon nanotubes, or a combination of two or more of the foregoing in an amount of 0.3 to 20 weight percent. Within this range, the electrically conductive filler may be present in an amount greater than or equal to 0.5 weight percent, or, more specifically, in an amount greater than or equal to 0.7 weight percent, or, even more specifically, in an amount greater than or equal to 0.8 weight percent. Also within this range, the electrically conductive carbon filler may be present in an amount less than or equal to 15 weight percent, or, more specifically, less than or equal to 10 weight percent, or, even more specifically, less than or equal to 5 weight percent. Weight percent is based on the total weight of the thermoplastic composition.

In some embodiments it is desirable to incorporate a sufficient amount of electrically conductive filler to achieve a specific volume resistivity that is sufficient to permit the composition to dissipate electrostatic charges or to be thermally dissipative.

The phosphinate may comprise one or more phosphinates of formula II, II, or IV

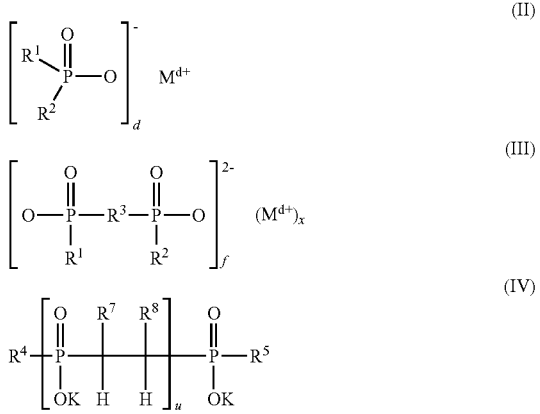

wherein $R^1$ and $R^2$ are independently $C_1$-$C_6$ alkyl, or aryl; $R^3$ is independently $C_1$-$C_{10}$ alkylene, $C_6$-$C_{10}$ arylene, $C_6$-$C_{10}$ alkylarylene, or $C_6$-$C_{10}$ arylalkylene. M is calcium, magnesium, aluminum, zinc, or a combination comprising one or more of the foregoing. The variable d is 2 or 3. The variable f is 1, 2 or 3. The variable x is 1 or 2. Each $R^4$ and $R^5$ are independently a hydrogen group or a vinyl group of the formula —$CR^7$=$CHR^8$. $R^7$ and $R^8$ are independently hydrogen, carboxyl, carboxylic acid derivative, $C_1$-$C_{10}$ alkyl, phenyl, benzyl, or an aromatic susbstituted with a $C_1$-$C_8$ alkyl. K is independently hydrogen or a 1/r metal of valency r. The variable u is the average number of monomer units and may have a value of 1 to 20.

Examples of $R^1$ and $R^2$ include, but are not limited to, methyl, ethyl, n-propyl, isopropyl, n-butyl, tert-butyl, n-pentyl, and phenyl. Examples of $R^3$ include, but are not limited to, methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnapthylene, ethylnapthylene, tert-butylnaphthylene, phenylethylene, phenylpropylene, and phenylbutylene.

The mono- and diphosphinates (formulas II and III respectively) may be prepared by reacting the corresponding phosphinic acid with a metal oxide and/or metal hydroxide in an aqueous medium as taught in EP 0 699 708.

The polymeric phosphinates (formula IV) may be prepared by reacting hypophosphorous acid and or its alkali metal salt with an acetylene of formula (V)

$R^7$—C≡C—$R^8$ (V).

The resulting polymeric phosphinic acid or polymeric phosphinic acid salt is then reacted with a metal compound of groups IA, IIA, IIIA, IVA, VA, IIB, IVB, VIIB, VIIIB of the Periodic Table as taught in U.S. Patent Application No. 2003/0216533.

In one embodiment, greater than or equal to 95% of $R^1$ and $R^2$ are ethyl.

In one embodiment the phosphinate is in particulate form. The phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the phosphinate may be combined with a polymer, such as a poly(arylene ether), a polyolefin, a polyamide, an impact modifier, or combination of two or more of the foregoing polymers to form a masterbatch. The phosphinate masterbatch comprises the phosphinate in an amount greater than is present in the thermoplastic composition. Employing a masterbatch for the addition of the phosphinate to the other components of the composition can facilitate addition and improve distribution of the phosphinate.

The composition comprises an amount of phosphinate sufficient to achieve a flame retardance of V-1 or better at a thickness of 2.0 millimeters according to UL94. In one embodiment the composition comprises an amount of phosphinate sufficient to achieve a flame retardance of V-0 at a thickness of 2.0 millimeters according to UL94. For example, the composition may comprise phosphinate in an amount of 5 to 25 weight percent. Within this range, the phosphinate may be present in an amount greater than or equal to 7 weight percent, or, more specifically, in an amount greater than or equal to 8 weight percent, or, even more specifically, in an amount greater than or equal to 9 weight percent. Also within this range the phosphinate may be present in an amount less than or equal to 22 weight percent, or, more specifically, less than or equal to 17 weight percent, or, even more specifically, less than or equal to 15 weight percent. Weight percent is based on the total weight of the thermoplastic composition.

In one embodiment the composition comprises a phosphinate and a flame retardant augment selected from the group consisting of melamine polyphosphate, zinc borate, low melting glass, titanium dioxide, talc, and combinations of two or more of the foregoing flame retardant augments. The amount of phosphinate and the amount of flame retardant augment(s) are sufficient to achieve a flame retardance of V-1 or better at a thickness of 2.0 millimeters according to UL94. In one embodiment the composition comprises an amount of phosphinate and flame retardant augment(s) sufficient to achieve a flame retardance of V-0 at a thickness of 2.0 millimeters according to UL94. For example, the composition may comprise phosphinate in an amount of 1 to 11 weight percent. Within this range, the phosphinate may be present in an amount greater than or equal to 2 weight percent, or, more specifically, in an amount greater than or equal to 3 weight percent, or, even more specifically, in an amount greater than or equal to 4 weight percent. Also within this range the phosphinate may be present in an amount less than or equal to 10 weight percent, or, more specifically, less than or equal to 9 weight percent, or, even more specifically, less than or equal to 8 weight percent. Weight percent is based on the total weight of the thermoplastic composition.

The composition may optionally comprise an inorganic compound such as an oxygen compound of silicon, a magnesium compound, a metal carbonate of metals of the second main group of the periodic table, red phosphorus, a zinc compound, an aluminum compound or a composition comprising one or more of the foregoing. The oxygen compounds of silicon can be salts or esters of orthosilicic acid and condensation products thereof; silicates; zeolites; silicas; glass powders; glass-ceramic powders; ceramic powders; or combinations comprising one or more of the foregoing oxygen compound of silicon. The magnesium compounds can be magnesium hydroxide, hydrotalcites, magnesium carbonates, magnesium calcium carbonates, or a combination comprising one or more of the foregoing magnesium compounds. The red phosphorus can be elemental red phosphorus or a preparation in which the surface of the phosphorus has been coated with low-molecular-weight liquid substances, such as silicone oil, paraffin oil or esters of phthalic acid or adipic acid, or with polymeric or oligomeric compounds, e.g., with phenolic resins or amino plastics, or else with polyurethanes. The zinc compounds can be zinc oxide, zinc stannate, zinc hydroxystannate, zinc phosphate, zinc borate, zinc sulfides, or a composition comprising one or more of the foregoing zinc compounds. The aluminum compounds can be aluminum hydroxide, aluminum phosphate, or a combination thereof.

The composition may optionally comprise a nitrogen compound or combination of nitrogen compounds. Exemplary nitrogen compounds include those having the formulas (VI) to (XI):

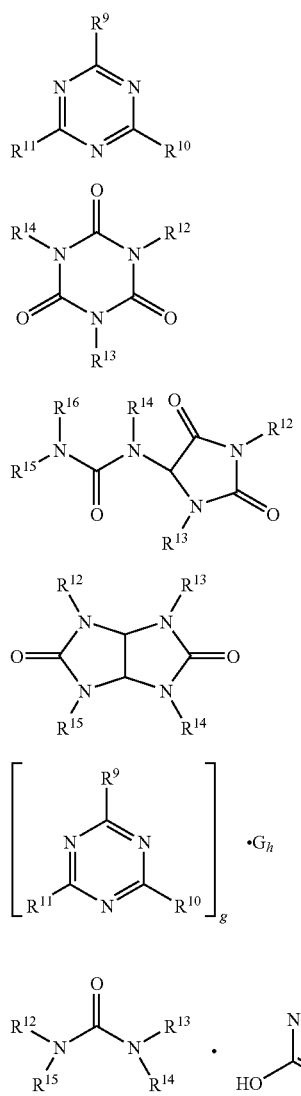

wherein $R^9$ to $R^{11}$ are independently hydrogen; $C_1$-$C_8$-alkyl; $C_5$-$C_{16}$-cycloalkyl unsubstituted or substituted with a hydroxyl function or with a $C_1$-$C_4$-hydroxyalkyl function; $C_5$-$C_{16}$-alkylcycloalkyl, unsubstituted or substituted with a hydroxyl function or with a $C_1$-$C_4$-hydroxyalkyl function; $C_2$-$C_8$-alkenyl; $C_2$-$C_8$-alkoxy; $C_2$-$C_8$-acyl; $C_2$-$C_8$-acyloxy; $C_6$-$C_{12}$-aryl; $C_6$-$C_{12}$-arylalkyl; —$OR^{20}$; —$N(R^{20})R^{12}$; N-alicyclic; N-aromatic systems;

wherein $R^{20}$ is hydrogen; $C_1$-$C_8$-alkyl; $C_5$-$C_{16}$-cycloalkyl, unsubstituted or substituted with a hydroxyl function or with a $C_1$-$C_4$-hydroxyalkyl function; $C_5$-$C_{16}$-alkylcycloalkyl, unsubstituted or substituted with a hydroxyl function or with a $C_1$-$C_4$-hydroxyalkyl function; $C_2$-$C_8$-alkenyl; $C_1$-$C_8$-alkoxy; $C_1$-$C_8$-acyl; $C_1$-$C_8$-acyloxy; $C_6$-$C_{12}$-aryl; or $C_6$-$C_{12}$-arylalkyl;

wherein $R^{12}$ to $R^{16}$ are groups identical with $R^{20}$ or else —O—$R^{20}$;

wherein g and h, independently of one another, are 1, 2, 3 or 4;

wherein G is the residue of an acid which can form an adduct with triazine compounds (VI).

The nitrogen compound may also be an ester of tris(hydroxyethyl) isocyanurate with aromatic polycarboxylic acids, a nitrogen-containing phosphate of the formula $(NH_4)_y H_{3-y}PO_4$ or $(NH_4PO_3)_z$, where y is from 1 to 3 and z is from 1 to 10,000 or a combination comprising one or more of the foregoing nitrogen compounds.

Exemplary nitrogen compounds include melamine polyphosphate, melem phosphate, melam phosphate, melamine pyrophosphate, melamine, melamine cyanurate, combinations comprising one or more of the foregoing, and the like.

In one embodiment the composition comprises a flame retardant augment selected from the group consisting of melamine polyphosphate, zinc borate, low melting glass, titanium dioxide, talc, and combinations of two or more of the foregoing augments.

The amount of zinc borate, when present, may be 0.1 to 4 weight percent based on the total weight of the composition. Within this range the amount of zinc borate may be greater than or equal to 0.5, or, more specifically, greater than or equal to 0.8 weight percent. Also within this range the amount of zinc borate may be less than or equal to 3.

The amount of melamine polyphosphate, when present, may be 0.1 to 5 weight percent based on the total weight of the composition. Within this range the amount of melamine polyphosphate may be greater than or equal to 0.2, or, more specifically, greater than or equal to 0.5 weight percent. Also within this range the amount of melamine polyphosphate may be less than or equal to 3, or, more specifically, less than or equal to 2.5 weight percent.

The amount of talc, when present, may be 0.1 to 6 weight percent based on the total weight of the composition. Within this range the amount of talc may be greater than or equal to 0.5, or, more specifically, greater than or equal to 1 weight percent. Also within this range the amount of talc may be less than or equal to 5, or, more specifically, less than or equal to 4 weight percent. In one embodiment the talc has an average particle size of 1 to 5 micrometers.

The composition may comprise a low melting glass. The low melting glass contains phosphate, usually in the form of $P_2O_5$. The glass further contains at least one of the following components: MO; $M'_2O$; $Al_2O_3$; $B_2O_3$; or $SO_3$. In the formula "MO", M is a bivalent metal. Exemplary bivalent metals include Mg, Ca, Zn, Sn, Ba, and combinations of two or more of the foregoing bivalent metals. In one embodiment the low melting glass comprises zinc oxide. In the formula "$M'_2O$", M' an alkali metal, e.g., Li, Na, K and combinations comprising at least one of the foregoing alkali metals. The amount of the phosphorous component in the glass may be 10 mole % to 60 mole %, calculated as $P_2O_5$. In some embodiments, the level of phosphorous is 15 mole % to 45 mole %. Non-limiting examples of low melting glass are disclosed in U.S. Patent Publication No. 2004/0167294.

In one embodiment the low melting glass comprises:
15 mole % to 45 mole % $P_2O_5$;
3 mole % to 60 mole % MO;
3 mole % to 40 mole % $M'_2O$; and
3 mole % to 25 mole % $B_2O_3$.

In one embodiment the low melting glass comprises:
15 mole % to 30 mole % $P_2O_5$;
10 mole % to 55 mole % ZnO;
0 mole % to 15 mole % of a MO compound other than ZnO;
5 mole % to 35 mole % of a compound of the formula $M'_2O$;
1 mole % to 5 mole % $Al_2O_3$;
8 mole % to 20 mole % $B_2O_3$; and
3 mole % to 30 mole % $SO_3$.

In another embodiment the low melting glass comprises primarily three components, each at a similar level:
30 mole % to 35 mole % $P_2O_5$;
30 mole % to 35 mole % ZnO; and
30 mole % to 35 mole % $SO_3$.

The low melting glass may be free of any halogenated compounds. In some embodiments, the material is also free of heavy metal oxides like PbO and BaO.

The low-melting glass has a glass transition temperature (Tg) of 200° C. to 500° C. Within this range the Tg may be greater than or equal to 250° C. Also within this range the Tg may be less than or equal to 400° C. The Tg can be adjusted, in part, by varying the glass ingredients, which have different, individual melting points.

The low-melting glass has a melting temperature (Tm) of 250° C. to 700° C. Within this range the Tm may be greater than or equal to 300° C. Also within this range the Tm may be less than or equal to 650° C.

In some embodiments, the low melting glass is treated with a surface-treatment agent. These agents are known in the art and described in many references. General examples include U.S. Pat. Nos. 6,492,028 and 5,648,169. (Some of the additives are referred to as "sizing agents"). Non-limiting examples of the surface-treatment agents include coupling agents, film-formers, lubricants, antistatic agents, and mixtures thereof.

The amount of low melting glass, when present, may be 0.1 to 6 weight percent based on the total weight of the composition. Within this range the amount of low melting glass may be greater than or equal to 0.5, or, more specifically, greater than or equal to 1 weight percent. Also within this range the amount of low melting glass may be less than or equal to 5, or, more specifically, less than or equal to 4 weight percent.

The amount of titanium dioxide, when present, may be 0.1 to 6 weight percent based on the total weight of the composition. Within this range the amount of titanium dioxide may be greater than or equal to 0.5, or, more specifically, greater than or equal to 1 weight percent. Also within this range the amount of titanium dioxide may be less than or equal to 5, or, more specifically, less than or equal to 4 weight percent.

In some embodiments the weight ratio of flame retardant augment (including combinations of augments) to phosphinate is less than or equal to 0.75, or, more specifically, less than or equal to 0.5

In some embodiments the total combined amount of phosphinate and flame retardant augment (including combinations of augments) is less than or equal to 12 weight percent, or, more specifically, less than or equal to 11 weight percent, or even more specifically less than or equal to 10 weight percent, based on the total weight of the composition. Decreasing the amount of phosphinate and flame retardant augment improves overall physical properties such as impact and ductility.

In some embodiments the ratio of the combined weight of phosphinate and flame retardant augment to the combined weight of polyamide, electrically conductive filler and impact modifier is less than 0.20.

In one embodiment the phosphinate, flame retardant augment(s) or a combination of phosphinate and flame retardant augment(s) is combined with a thermoplastic resin to form a flame retardant masterbatch. The masterbatch is used to form the composition. In one embodiment the thermoplastic resin used to form the masterbatch is a polyamide. The resin has sufficiently low viscosity to blend with the phosphinate. The masterbatch may comprise 10 to 80 weight percent phosphinate and 20 to 80 weight percent thermoplastic resin with respect to the combined weight of phosphinate and thermoplastic resin. Within this range the phosphinate may be present in the masterbatch in an amount greater than or equal to 25 weight percent, or, more specifically, greater than or equal to 30 weight percent. Also within this range the phosphinate may be present in the masterbatch in an amount less than or equal to 75 weight percent, or, more specifically, less than or equal to 70 weight percent. The composition can be prepared melt mixing or a combination of dry blending and melt mixing. Melt mixing can be performed in single or twin screw type extruders or similar mixing devices which can apply a shear to the components.

All of the ingredients may be added initially to the processing system. In some embodiments, the poly(arylene ether) may be melt mixed with the compatibilizing agent and optionally pelletized before further melt mixing with other components. Additionally other ingredients such as an impact modifier, phosphinate, a portion of the polyamide, and a flame retardant augment, individually or in various combinations, may be melt mixed with the compatibilizing agent and poly(arylene ether). The pelletized composition comprising poly(arylene ether) is melt mixed with the polyamide (the second portion when two portions are employed) and the remaining components of the composition.

In one embodiment, the poly(arylene ether) is melt mixed with the compatibilizing agent to form a functionalized poly(arylene ether). The functionalized poly(arylene ether) is then melt mixed with the other ingredients. In another embodiment the poly(arylene ether), compatibilizing agent, impact modifier, phosphinate, a flame retardant augment(s) are melt mixed to form a first material and the polyamide is then melt mixed with the first material, for example, by adding it through a port downstream when an extruder is used.

In another embodiment, the poly(arylene ether), compatibilizing agent and optionally a portion of polyamide is melt mixed to form a first melt mixture that is further melt mixed with polyamide (a second portion when two portions are used), the flame retardant masterbatch, and electrically conductive additive. The impact modifier may be part of the first melt mixture or be added after the formation of the first melt mixture. When the composition comprises two impact modifiers they can be added together or separately.

When using an extruder, all or part of the polyamide may be fed through a port downstream. While separate extruders may be used in the processing, preparations in a single extruder having multiple feed ports along its length to accommodate the addition of the various components simplifies the process. It is often advantageous to apply a vacuum to the melt through one or more vent ports in the extruder to remove volatile impurities in the composition.

The electrically conductive filler may be added by itself, with other ingredients (optionally as a dry blend) or as part of a masterbatch. In one embodiment, the electrically conductive filler can be part of a masterbatch comprising polyamide. The electrically conductive filler may be added with the poly(arylene ether), with the polyamide (the second portion when two portions are employed), or after the addition of the polyamide (the second portion when two portions are employed).

In one embodiment the composition consists essentially of a compatibilized poly(arylene ether)/polyamide blend, an electrically conductive filler, a phosphinate, and a flame retardant augment selected from the group consisting of melamine polyphosphate, zinc borate, low melting glass, talc, and combinations of two or more of the foregoing flame retardant augments. As used herein with regard to the composition the term "consisting essentially of" allows for more inclusion of antioxidants, processing aids, mold release agents, and stabilizers.

In one embodiment the composition consists essentially of compatibilized poly(arylene ether)/polyamide blend, a phosphinate, and a flame retardant augment selected from the group consisting of melamine polyphosphate, zinc borate, low melting glass, titanium dioxide, talc, and combinations of two or more of the foregoing flame retardant augments.

In one embodiment the composition consists of a compatibilized poly(arylene ether)/polyamide blend, an electrically conductive filler, a phosphinate, and a flame retardant augment selected from the group consisting of melamine polyphosphate, zinc borate, low melting glass, talc, and combinations of two or more of the foregoing flame retardant augments.

In one embodiment the composition consists of a compatabilized poly(arylene ether)/polyamide blend, a phosphinate, and a flame retardant augment selected from the group consisting of melamine polyphosphate, zinc borate, low melting glass, titanium dioxide, talc, and combinations of two or more of the foregoing flame retardant augments.

In one embodiment the composition comprises a reaction product of poly(arylene ether); polyamide; electrically conductive filler; compatibilizing agent; optional impact modifier; phosphinate; and a flame retardant augment selected from the group consisting of melamine polyphosphate, zinc borate, low melting glass, and talc. As used herein a reaction product is defined as the product resulting from the reaction of two or more of the foregoing components under the conditions employed to form the composition or during further processing of the components, for example, during melt mixing or molding.

In some embodiments melt mixing is performed using an extruder and the composition exits the extruder in a strand or multiple strands. The shape of the strand is dependent upon the shape of the die used and has no particular limitation. The strand diameter and the pellet length are typically chosen to prevent or reduce the production of fines (particles that have a volume less than or equal to 50% of the pellet) and for maximum efficiency in subsequent processing such as profile extrusion. An exemplary pellet length is 1 to 5 millimeters and an exemplary pellet diameter is 1 to 5 millimeters.

The composition may be converted to articles using injection molding. Exemplary articles include electrical connectors, power distribution boxes, fuse boxes, and vehicular body parts such as a body panel or tank flap.

The pellets may exhibit hygroscopic properties. Once water is absorbed it may be difficult to remove. It is advantageous to protect the composition from ambient moisture. In one embodiment the pellets, once cooled to a temperature of 50° C. to 110° C., are packaged in a container comprising a mono-layer of polypropylene resin free of a metal layer wherein the container has a wall thickness of 0.25 millimeters to 0.60 millimeters. The pellets, once cooled to 50 to 110° C. can also be packaged in foiled lined containers such as foil lined boxes and foil lined bags or other types on containers having a moisture barrier.

The composition may be converted to articles using low shear thermoplastic processes such as film and sheet extrusion, profile extrusion, extrusion molding, compression molding and blow molding. Film and sheet extrusion processes may include and are not limited to melt casting, blown film extrusion and calendaring. Co-extrusion and lamination processes may be employed to form composite multi-layer films or sheets. Before the pelletized composition is formed into an article the pelletized composition may be dried by keeping the pelletized composition at an elevated temperature although extended drying may affect the performance of the composition. Water, above 0.01-0.1%, or, more specifically, 0.02-0.07% moisture by weight, can hinder the use of the composition in some applications.

In one embodiment the flame retardant composition is formed into articles by profile extrusion. Profile extrusion is a low pressure/low shear molding process that requires materials with a sufficiently high melt strength and a sufficiently low melt volume rate to maintain the extruded shape after leaving the die. Profile extruded articles are unitary non-enclosed articles although profile extruded articles may be enclosed by subsequent operations such as gluing, welding or the like. The unitary, non-enclosed article may further comprise a coating such as paint or an electrostatic powder coating. Exemplary articles comprising unitary non-enclosed articles include window profiles, window casings, room partitions, furniture frames, and the like. The articles may be painted either by electrostatic methods or conventionally.

The following non-limiting examples further illustrate the various embodiments described herein.

EXAMPLES

The following examples used the materials shown in Table 1. Weight percent, as used in the examples, is determined based on the total weight of the composition unless otherwise noted.

TABLE 1

| Material Name | Material Description/Supplier |
| --- | --- |
| PPE | A poly(2,6-dimethylphenylene ether) with an intrinsic viscosity of 0.46 dl/g as measured in chloroform at 25° C. commercially available from General Electric Company. |
| SEBS | Polystyrene-poly(ethylene-butylene)-polystyrene commercially available as KRATON G1651 from Kraton Polymers |
| Nylon-6,6 | Polyamide having a 2.66 ml/g relative viscosity determined according to DIN 53727 (1.0 wt % solution in 96 wt % sulfuric acid) and commercially available from Solutia under the tradename VYDYNE 21Z. |
| Nylon-6 #1 | Polyamide having a relative viscosity of 2.40 determined according to DIN 53727 (1.0 wt % solution in 96 wt % sulfuric acid) and commercially available from Rhodia under the tradename TECHNYL HSN 27/32-35 LC Natural. |
| Nylon-6 #2 | Polyamide having a relative viscosity of 2.85 determined according to DIN 53727 (1.0 wt % solution in 96 wt % sulfuric acid) and commercially available from Custom Resins under the tradename NYLENE NX4512. |

TABLE 1-continued

| Material Name | Material Description/Supplier |
|---|---|
| 1312 | A mixture of components comprising a phosphinate available commercially from Clariant corporation under the tradename EXOLIT OP 1312 |
| CCB | Electrically conductive carbon black commercially available from Akzo under the tradename KETJEN BLACK EC600JD. |
| CCB #2 | Electrically conductive carbon black commercially available from Degussa under the tradename PRINTEX XE2. |
| RDP | Resorcinol diphosphate |
| TPP | Triphenyl phosphate |
| MC | Melamine cyanurate |
| BP | Boron phosphate |
| SF | Silicone fluid commercially available from GE Silicones under the tradename SF1706. |
| 1230 | Flame retardant comprising a phosphinate available commercially from Clariant corporation under the tradename EXOLIT OP 1230 |
| MPP | Melamine polyphosphate commercially available from Ciba under the tradename MELAPUR200. |
| Zinc borate | Zinc borate commercially available from Chemtura under the tradename ZB467. |
| LMG | Low melting glass commercially available from Asahi Glass Co., Ltd. under the tradename Glass Frit ZP 150. |
| Talc | Talc having an average particle size of 2 to 5 micrometers commercially available from 20Microns under the tradename ULTRATALC. |

Examples 1-7 and Comparative Examples 1-11

PPE, 0.1 weight percent (wt %) potassium iodide, 0.05 wt % copper iodide, 0.3 wt % IRGANOX 1076 commercially available from Ciba-Geigy, 0.6 wt % citric acid, and the nylon-6,6 were melt mixed to form a mixture. The mixture was further melt mixed with nylon-6 and a masterbatch of electrically conductive carbon black in nylon-6. In compositions containing EXOLIT OP 1312, SF, BP, TPP, RDP, MC or a combination of two or more of the foregoing, these materials were added with the polyphenylene ether at the feedthroat. The compositions were molded into bars having a thickness of 2.0 millimeters for flammability testing. Flammability tests were performed following the procedure of Underwriter's Laboratory Bulletin 94 entitled "Tests for Flammability of Plastic Materials, UL94" (Dec. 12, 2003 Revision). Each bar that extinguished was ignited twice. According to this procedure, the materials were classified as either HB, V-0, V-1, or V-2 on the basis of the test results obtained for ten samples. If more than 3 of the first 5 bars had a burn time >30 seconds, then the burning was stopped at 5 bars. The criteria for each of these flammability classifications according to UL94, are, briefly, as follows.

HB: In a 5 inch sample, placed so that the long axis of the sample is parallel to the flame, the rate of burn of the sample is less than 3 inches per minute, and the flames should be extinguished before 4 inches of sample are burned.

V-0: In a sample placed so that its long axis is parallel to the flame, the average period of flaming and/or smoldering after removing the igniting flame should not exceed ten seconds and none of the vertically placed samples should produce drips of burning particles which ignite absorbent cotton.

V-1: In a sample placed so that its long axis is parallel to the flame, the average period of flaming and/or smoldering after removing the igniting flame should not exceed thirty seconds and none of the vertically placed samples should produce drips of burning particles which ignite absorbent cotton.

V-2: In a sample placed so that its long axis is parallel to the flame, the average period of flaming and/or smoldering after removing the igniting flame should not exceed thirty seconds and the vertically placed samples produce drips of burning particles which ignite cotton.

Results are shown in Table 2. Flame out time (FOT) is the average of the sum of the amounts of time the bar burned each time it was lit. "NA" in the UL94 rating column means that the sample did not fall within the parameters of any of the UL94 ratings.

Some examples were tested for specific volume resistivity (SVR). The compositions were molded into ISO tensile bars. The bars were scored at a location 25 millimeters on each side from the center of the bar and then submerged in liquid nitrogen for approximately 5 minutes. As soon as the bars were removed from the liquid nitrogen they were snapped at the score marks for a brittle break. The ends were painted with electrically conductive silver paint and dried. Resistance was measured by placing the probes of a handheld multimeter such as a Mastech M92A on each painted end of the bar. The specific volume resistivity was calculated as the resistance (in Ohms)×bar width (in centimeters (cm))×bar depth (cm) divided by the bar length (cm). Results are shown in Table 2. Comparative examples are noted as CE and examples are Ex.

Melt Volume rate was determined according to ISO 1133. Vicat B was determined according to ISO 306.

TABLE 2

| Component | CE 1 | CE 2 | CE 3 | CE 4 | CE 5 | CE 6 | Ex. 1 | Ex. 2 | Ex. 3 | Ex. 4 |
|---|---|---|---|---|---|---|---|---|---|---|
| PPE | 49.90 | 42.64 | 42.64 | 42.64 | 47.21 | 49.00 | 44.34 | 48.0 | 42.0 | 42.0 |
| SEBS | 4.27 | 4.07 | 4.07 | 4.07 | 4.04 | 4.0 | 3.86 | 6.0 | 6.0 | 2.0 |
| Nylon-66 | 11.5 | 10.94 | 10.94 | 10.94 | 10.88 | 11.29 | 9.86 | 8.0 | 12.0 | 8.0 |
| Nylon-6 #1 | — | — | — | — | — | 22.98 | 29.35 | 27.0 | 27.0 | 33.0 |
| Nylon-6 #2 | 33.06 | 31.46 | 31.46 | 31.46 | 31.28 | 9.49 | — | — | — | — |
| CCB | — | — | — | — | — | 2.0 | 2.0 | 2.2 | 1.8 | 2.2 |
| 1312 | — | — | — | — | — | — | 9.34 | 7.55 | 9.95 | 11.55 |
| RDP | — | — | 9.68 | — | — | — | — | — | — | — |
| TPP | — | — | — | 9.68 | — | — | — | — | — | — |
| MC | — | 9.68 | — | — | — | — | — | — | — | — |
| BP | — | — | — | — | 3.27 | — | — | — | — | — |

TABLE 2-continued

| | | | | | | | | | | |
|---|---|---|---|---|---|---|---|---|---|---|
| SF | — | — | — | — | 2.12 | — | — | — | — | — |
| Physical properties | | | | | | | | | | |
| Melt Volume Rate | | | | | | | 9.0 | 5.9 | 10.8 | 12.6 |
| Vicat B | | | | | | | 194 | 183 | 186 | 194 |
| SVR | | | | | | | 299 | 204 | 641 | 142 |
| Avg. FOT | 100+ | 100+ | 100+ | 23.5 | 18.8 | 100+ | 4.8 | 3.9 | 3.9 | 3.9 |
| UL94 | NA | NA | NA | Near V-1 | Near V-1 | NA | V-0 | V-0 | V-0 | V-0 |

| Component | Ex. 5 | Ex. 6 | Ex. 7 | CE 7 | CE 8 | CE 9 | CE10 | CE 11 |
|---|---|---|---|---|---|---|---|---|
| PPE | 42.95 | 48.0 | 42.0 | 43.74 | 40.21 | 39.61 | 39.61 | 48.95 |
| SEBS | 6.0 | 2.0 | 6.0 | 3.97 | 3.92 | 3.96 | 3.96 | 4.2 |
| Nylon-66 | 8.0 | 8.0 | 12.0 | 11.22 | 11.07 | 11.18 | 11.18 | 11.3 |
| Nylon-6 ·1 | 27.0 | 27.0 | 27.0 | 22.84 | 22.53 | 22.75 | 22.75 | 32.5 |
| Nylon-6 ·2 | — | — | — | 9.43 | 9.3 | 9.4 | 9.4 | — |
| CCB | 1.8 | 1.8 | 1.8 | 1.99 | 1.96 | 1.98 | 1.98 | 1.8 |
| 1312 | 13.0 | 11.95 | 9.95 | — | — | — | — | — |
| RDP | — | — | — | — | — | 9.89 | — | — |
| TPP | — | — | — | — | — | — | 9.89 | — |
| MC | — | — | — | — | 9.79 | — | — | — |
| BP | — | — | — | 3.38 | — | — | — | — |
| SF | — | — | — | 2.18 | — | — | — | — |
| Physical properties | | | | | | | | |
| Melt Volume Rate | 9.8 | 10.4 | 10.8 | — | — | — | — | 10.2 |
| Vicat B | 181 | 195 | 186 | — | — | — | — | 198 |
| SVR | 386 | 284 | 641 | — | — | — | — | 23832 |
| Avg. FOT | 3.9 | 4.2 | 3.9 | 49.8 | 100+ | 100+ | 45.9 | 100+ |
| UL94 | V-0 | V-0 | V-0 | NA | NA | NA | NA | NA |

Comparative Examples 1-5 demonstrate flame retardance behavior of several blends that do not contain electrically conductive carbon black. Comparative Example 1 shows a generic compatibilized polyamide/poly(arylene ether) blend. No flame retarding additives were present. The flame retardance is poor, with an average flame out time (FOT) per bar greater than 100 seconds. Other well known flame retardants were added in similar loadings in Comparative Examples 2 through 5. Comparative Example 2 with melamine cyanurate (MC) and Comparative Example 3 with resorcinol diphosphate (RDP) both had average FOT greater than 100 seconds. Comparative Example 4, with triphenylphosphate (TPP), had an average FOT of 23.5 seconds, which begins to approach V-1 performance. However several of the individual burn times were longer than 30 seconds and therefore the material received no rating. Finally, a combination of boron phosphate (BP) and silicone fluid (SF) (Comparative Example 5) produced a sample with an average FOT of 18.8 seconds. This sample also was very close to but did not meet V-1 criteria in that one burn time was longer than 30 seconds.

Comparative Examples 6-11 demonstrate the flame retardance behavior of several blends that contain electrically conductive carbon black. Comparative Example 6 is an example of a electrically conductive compatibilized polyamide/poly(arylene ether) blend without flame retardants. As can be seen, the flame retardancy is very poor with an average FOT greater than 100 seconds per bar. Comparative Example 7 includes the same boron phosphate/silicone fluid flame retardant system as in Comparative Example 5. Here the average FOT per bar is now 48.8 seconds where without the electrically conductive carbon black, it was 18.8 seconds. This shows that the inclusion of the electrically conductive carbon black actually decreases the overall flame retardance performance of the blend. Similarly Comparative Example 10 uses TPP as the flame retardance agent. This blend can be compared to Comparative Example 4. With the electrically conductive carbon black in the blend, the average FOT per bar increases from 23.5 seconds to 45.9 seconds.

Examples 1 through 7 show blends that contain a phosphinate. All three samples for each of these examples show a total average FOT below 5 seconds per bar, even including from 1.8 to 2.2 weight percent of electrically conductive carbon black. So, use of a phosphinate provides V-0 performance in the electrically conductive blends.

Additionally, a comparison of the specific volume resistivity of Comparative Example 11 (approximately 24000 Ohm-cm) to the specific volume resistivity of Examples 1 through 7 shows that similar blends that have the same level of carbon black, but which also include phosphinate exhibit markedly lower specific volume resistivity. In all of Examples 1 through 7, the specific volume resistivity decreases by at least 97%. So, the inclusion of phosphinate also unexpectedly reduces the specific volume resistivity, or increases the conductivity, of the compatibilized poly(arylene ether)/polyamide blends.

Examples 8-21 and Comparative Examples 12-20

Amounts are in weight percent and are based on the total amount of the composition unless otherwise noted. Screening experiments were performed by melt mixing PPE, 0.3 wt % liquid potassium iodide, 0.05 wt % copper iodide, 0.3 wt % Irganox 1076, 0.6 wt % citric acid, 1.0 wt % processing aid commercially available as DYNAMAR MB from Smile Plastics, SEBS, 1230, flame retardant augment, and nylon-6,6 to form a mixture. The mixture was further melt mixed with nylon-6 #1 and a masterbatch of CCB (CCB MB) and nylon-6 #1. The masterbatch comprised 90 wt % nylon-6 #1 and 10 wt % CCB based on the total weight of the masterbatch. The compositions are shown in Table 3. The compositions were molded into bars having a thickness of 2 millimeters for flammability testing. Results are shown in Table 3.

iodide, SEBS, 1.0 wt % DYNAMAR MB, 1230 and the flame retardant augment were added at the feedthroat of an extruder and melt mixed. Nylon-6 #1 and a masterbatch of CCB in nylon-6 were added downstream. The masterbatch of CCB

TABLE 3

|  | CE 12 | CE 13 | CE 14 | CE 15 | CE 16 | CE 17 | CE 18 | Ex. 8 | Ex 9 | Ex. 10 | Ex 11 | Ex. 12 |
|---|---|---|---|---|---|---|---|---|---|---|---|---|
| PPE | 35.4 | 37.6 | 38.7 | 39.8 | 39.8 | 39.8 | 39.8 | 39.8 | 39.8 | 39.8 | 39.8 | 39.8 |
| Nylon-6,6 | 10.0 | 10.61 | 10.9 | 11.3 | 11.3 | 11.3 | 11.3 | 11.3 | 11.3 | 11.3 | 11.3 | 11.3 |
| SEBS | 4.5 | 4.5 | 4.5 | 4.5 | 4.5 | 4.5 | 4.5 | 4.5 | 4.5 | 4.5 | 4.5 | 4.5 |
| 1230 | 13.8 | 10.0 | 8.0 | 6.0 | 6.0 | 6.0 | 6.0 | 6.0 | 6.0 | 6.0 | 6.0 | 6.0 |
| Nylon-6 #1 | 17.0 | 18.0 | 18.6 | 19.2 | 19.2 | 19.2 | 19.2 | 19.2 | 19.2 | 19.2 | 19.2 | 19.2 |
| CCB MB | 17.0 | 17.0 | 17.0 | 17.0 | 17.0 | 17.0 | 17.0 | 17.0 | 17.0 | 17.0 | 17.0 | 17.0 |
| Expanded graphite | — | — | — | — | — | 1.0 | 3.0 | — | — | — | — | — |
| LMG | — | — | — | — | — | — | — | 1.0 | 2.0 | 2.0 | 4.0 | — |
| Zinc borate | — | — | — | — | — | — | — | — | — | — | — | 2.0 |
| Nanoclay | — | — | — | — | — | — | — | — | — | — | — | — |
| MPP | — | — | — | — | — | — | — | — | — | — | — | — |
| Talc | — | — | — | — | — | — | — | — | — | — | — | — |
| Avg. FOT(sec) | 2.7 | 2.62 | 10 | 11.8 | 9.1 | 13.1 | 6.7 | 12.3 | 4.6 | 9.4 | 14.3 | 6.0 |
| UL 94 Rating | V-0 | V-0 | NA | NA | NA | NA | NA | NA | V-1 | NA | NA | V-1 |

|  | Ex 13 | Ex. 14 | Ex 15 | CE 19 | CE 20 | Ex. 16 | Ex. 17 | Ex. 18 | Ex. 19 | Ex. 20 | Ex. 21 |
|---|---|---|---|---|---|---|---|---|---|---|---|
| PPE | 39.8 | 39.8 | 39.8 | 39.8 | 39.8 | 39.8 | 39.8 | 39.8 | 39.8 | 39.8 | 39.8 |
| Nylon-6,6 | 11.3 | 11.3 | 11.3 | 11.3 | 11.3 | 11.3 | 11.3 | 11.3 | 11.3 | 11.3 | 11.3 |
| SEBS | 4.5 | 4.5 | 4.5 | 4.5 | 4.5 | 4.5 | 4.5 | 4.5 | 4.5 | 4.5 | 4.5 |
| 1230 | 6.0 | 6.0 | 6.0 | 6.0 | 6.0 | 6.0 | 6.0 | 6.0 | 6.0 | 6.0 | 6.0 |
| Nylon-6 #1 | 19.2 | 19.2 | 19.2 | 19.2 | 19.2 | 19.2 | 19.2 | 19.2 | 19.2 | 19.2 | 19.2 |
| CCB MB | 17.0 | 17.0 | 17.0 | 17.0 | 17.0 | 17.0 | 17.0 | 17.0 | 17.0 | 17.0 | 17.0 |
| Expanded graphite | — | — | — | — | — | — | — | — | — | — | — |
| LMG | — | — | — | — | — | — | — | — | — | — | — |
| Zinc borate | 3.0 | 3.0 | 5.0 | — | — | — | — | — | — | — | — |
| Nanoclay | — | — | — | 1.0 | 3.0 | — | — | — | — | — | — |
| MPP | — | — | — | — | — | 2.0 | 2.0 | 4.0 | — | — | 2.0 |
| Talc | — | — | — | — | — | — | — | — | 3.0 | 3.0 | — |
| Avg. FOT(sec) | 6.6 | 5.4 | 12 | 12 | 24.2 | 2.9 | 1.9 | 1.4 | 2.3 | 9.5 | 2.5 |
| UL 94 Rating | V-1 | V-1 | NA | NA | NA | V-0 | V-0 | V-0 | V-0 | V-1 | V-0 |

As can be seen from the foregoing examples, inclusion of materials such as expanded graphite and nanoclay show little or no improvement in flame retardance compared to a similar composition containing only phosphinate as a flame retardant. In contrast, at least one example containing low melting glass, zinc borate, melamine polyphosphate, and talc show an improvement in the UL-94 rating. Additionally, an increase in the amount of some augments actually diminishes flame retardance.

Examples 22-27 and Comparative Examples 21-26

PPE, nylon-6,6, 0.6 wt % citric acid, 0.3 wt % Irganox 1076, 0.3 wt % liquid potassium iodide, 0.05 wt % copper and nylon-6 contained 10 wt % CCB and 90 wt % nylon-6 based on the total weight of the masterbatch. Compositions and physical properties are shown in Table 4. Amounts are in weight percent and are based on the total weight of the composition unless otherwise noted. The compositions were tested for specific volume resistivity (SVR) as described above. The values shown in Table 4 are in kilo ohms-centimeter. "OL" indicates a specific volume resistivity that is higher than the measurement range of the instrument. The compositions were tested for impact strength according to ISO 180/1A and the values are reported in kilojoules per square meter. The compositions were molded into bars having a thickness of 2 millimeters for flammability testing.

TABLE 4

|  | CE 21 | CE 22 | CE 23 | CE 24 | CE 25 | CE 26 | Ex. 22 | Ex. 23 | Ex. 24 | Ex. 25 | Ex. 26 | Ex. 27 |
|---|---|---|---|---|---|---|---|---|---|---|---|---|
| PPE | 35.45 | 38.73 | 38.73 | 38.73 | 38.73 | 38.73 | 39.30 | 38.73 | 38.73 | 38.73 | 38.73 | 38.73 |
| Nylon-6,6 | 10.00 | 10.93 | 10.93 | 10.93 | 10.93 | 10.93 | 11.09 | 10.93 | 10.93 | 10.93 | 10.93 | 10.93 |
| SEBS | 4.50 | 4.50 | 4.50 | 4.50 | 4.50 | 4.50 | 4.50 | 4.50 | 4.50 | 4.50 | 4.50 | 4.50 |
| PA6 | 17.00 | 18.59 | 18.59 | 18.59 | 18.59 | 18.59 | 18.86 | 18.59 | 18.59 | 18.59 | 18.59 | 18.59 |
| CCB-MB | 17.00 | 17 | 17 | 17 | 17 | 17 | 17 | 17 | 17 | 17 | 17 | 17 |
| 1230 | 13.80 | 8.00 | — | — | — | — | 6.00 | 7.00 | 7.00 | 7.00 | 5 | 5 |

TABLE 4-continued

|  | CE 21 | CE 22 | CE 23 | CE 24 | CE 25 | CE 26 | Ex. 22 | Ex. 23 | Ex. 24 | Ex. 25 | Ex. 26 | Ex. 27 |
|---|---|---|---|---|---|---|---|---|---|---|---|---|
| MPP | — | — | 8.00 | — | — | — | 1 | 1 | — | — | 1 | 1 |
| Zinc borate | — | — | — | 8.00 | — | — | — | — | 1 | — | 2 | — |
| LMG | — | — | — | — | 8 | — | — | — | — | 1 | — | — |
| Talc | — | — | — | — | — | 8 | — | — | — | — | — | 2 |
| SVR(kOhm-cm) | 110 | 9.8 | 2.8 | 78.5 | 102.7 | OL | 1.3 | 5.3 | 22 | 6.7 | 9.4 | 12.3 |
| Impact(kJ/m2) | 10.7 | 12.2 | — | — | — | — | 10.8 | 11.2 | 10.8 | 13.3 | 9.4 | 10.8 |
| Avg. FOT(sec) | 5.6 | 10+ | 100+ | 100+ | 100+ | 100+ | 2.5 | 1.9 | 2.9 | 4.1 | 3 | 4.6 |
| UL 94 Rating | V-0 | NA | NA | NA | NA | NA | V-0 | V-0 | V-0 | V-0 | V-0 | V-0 |

Comparative Examples 21 and 22 demonstrate flame retardance behavior of two blends that contain different amount of phosphinate without any flame retardant augments. Comparative Example 21 shows that at 13.8 weight percent of phosphinate V-0 performance was achieved without any flame retardant augment. Comparative Example 22 shows that at the reduced 8 weight percent of phosphinate V-0 performance was not achieved without a flame retardant augment. Comparative Examples 23-26 show that flame retardant augments alone do not achieve V-0 performance without phosphinate.

Examples 22-27 demonstrate the flame retardancy behavior of several blends that contain one or more flame retardant augments with only 5-7 wt % of phosphinate. Examples 22 and 23 show that at 6-7 wt % of phosphinate, V-0 performance was achieved with 1 wt % of melamine polyphosphate. Similarly, Example 24 shows that at 7 wt % of phosphinate, V-0 performance was achieved with 1 weight percent of zinc borate. Example 25 shows that at 7 wt % of phosphinate, V-0 performance was also achieved with 1 wt % of low melting glass. Moreover, Example 26 shows that V-0 performance was achieved at even lower level of phosphinate (5 wt %) when combined with 1 wt % of MPP and 2 wt % of zinc borate. Similarly, Example 27 shows that V-0 performance was achieved at the low 5 wt % level of phosphinate when combined with 1 wt % of MPP and 2 wt % of talc.

Examples 28-31

PPE, SEBS, 0.6 wt % citric acid, 0.3 wt % IRGANOX 1076, 0.3 wt % liquid potassium iodide, 0.05 wt % copper iodide, 1.0 wt % DYNAMAR MB, 5.0 wt % EXOLIT OP 1230, 1.0 wt % MPP, and 2.0 wt % zinc borate were added at the feedthroat of an extruder and melt mixed. Nylon-6 #1, and nylon-6,6 were added through a sidefeeder. In Examples 28 and 31 a masterbatch of CCB (CCB MB) or a masterbatch of MWNT (MWNT MB) (Example 31) were added through the sidefeeder with the polyamides. The masterbatch of CCB contained 10 wt % CCB and 90 wt % nylon-6 based on the total weight of the masterbatch. The masterbatch of MWNT contained 20 wt % MWNT and 80 wt % nylon-6,6 based on the total weight of the masterbatch. In Examples 29 and 30 conductive carbon black was added using a second sidefeeder.

Compositions and physical properties are shown in Table 5. Flammability results were obtained using bars having a thickness of 2 millimeters. The compositions were also tested for specific volume resistivity (SVR) as described above. The values shown in Table 5 are in kilo ohms-centimeter. The compositions were tested for impact strength according to ISO 180/1A and the values are reported in kilojoules per square meter.

TABLE 5

| Component | Ex. 28 | Ex. 29 | Ex. 30 | Ex. 31 |
|---|---|---|---|---|
| Feedthroat | | | | |
| PPE | 38.73 | 37.63 | 38.03 | 39.03 |
| SEBS | 4.50 | 4.5 | 4.5 | 4.5 |
| 1230 | 5 | 5 | 5 | 5 |
| MPP | 1 | 1 | 1 | 1 |
| zinc borate | 2 | 2 | 2 | 2 |
| Sidefeeder 1 | | | | |
| Nylon-6 #1 | 18.59 | 33.89 | 33.89 | 35 |
| Nylon-6,6 | 10.93 | 10.93 | 10.93 | 5.72 |
| CCB MB | 17.00 | — | — | — |
| MWNT MB | — | — | — | 5.5 |
| Sidefeeder 2 | | | | |
| CCB #2 | — | — | 2.4 | — |
| CCB | — | 2.8 | — | — |
| SVR(kOhm-cm) | 11.2 | 126 | 2.9 | 2.1 |
| Impact(kJ/m2) | 11 | 5.4 | 4.9 | 5.6 |
| Avg. FOT(sec) | 4 | 3 | 3.1 | 4.4 |
| UL94 Rating | V-0 | V-0 | V-0 | V-0 |

Examples 28 to 31 demonstrate flame retardance behavior of several electrically conductive blends that contain only 5 wt % phosphinate and two flame retardant augments MPP and zinc borate. These examples show that with 1 wt % of MPP and 2 wt % of zinc borate, V-0 performance was achieved along with good mechanical properties in Examples 28-30 with only 5 weight percent of phosphinate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All patents and patent publications cited herein are incorporated by reference in their entirety.

The invention claimed is:

1. An article comprising a flame retardant thermoplastic composition wherein the thermoplastic composition comprises:
   a compatibilized poly(arylene ether)/polyamide blend;
   an electrically conductive filler;
   a phosphinate; and
   a flame retardant augment selected from the group consisting of melamine polyphosphate, zinc borate, low melting glass, talc, and combinations of two or more of the foregoing flame retardant augments and further wherein the article is made by profile extrusion.

2. The article of claim 1 wherein the composition further comprises an impact modifier.

3. The article of claim 2 wherein the ratio of the combined weight of phosphinate and flame retardant augment to the combined weight of polyamide, electrically conductive filler and impact modifier is less than 0.20.

4. The article of claim 1 wherein the composition has a flame retardancy rating of V-1 or better according to Underwriter's Laboratory Bulletin 94 entitled "Tests for Flammability of Plastic Materials, UL94" (Dec. 12, 2003 revision) at a thickness of 2 millimeters.

5. The article of claim 1 wherein the composition has a specific volume resistivity less than or equal to $10^6$ ohm-cm.

6. The article of claim 1 wherein the phosphinate is present in an amount of 1 to 11 weight percent and the flame retardant augment or combination of augments is present in an amount of 0.1 to 6 weight percent, based on the total weight of the composition.

7. The article of claim 1 wherein the weight ratio of flame retardant augment to phosphinate is less than or equal to 0.75.

8. The article of claim 1 wherein the total combined amount of phosphinate and flame retardant augment is less than or equal to 12 weight percent, based on the total weight of the composition.

9. The article of claim 1 wherein the composition comprises melamine polyphosphate and zinc borate and the amount of zinc borate is greater than the amount of melamine polyphosphate.

10. The article of claim 1, wherein the article is a unitary, non-enclosed article.

11. A window frame comprising the article of claim 10.

12. A furniture frame comprising the article of claim 10.

13. A room partition comprising the article of claim 10.

14. An article comprising a flame retardant thermoplastic composition wherein the composition comprises:
a compatibilized poly(arylene ether)/ polyamide blend;
a phosphinate; and
a flame retardant augment selected from the group consisting of melamine polyphosphate, zinc borate, low melting glass, titanium dioxide, talc, and combinations of two or more of the foregoing flame retardant augments and further wherein the article is made by profile extrusion.

15. The article of claim 14 wherein the composition further comprises an impact modifier.

16. The article of claim 15 wherein the ratio of the combined weight of phosphinate and flame retardant augment to the combined weight of polyamide and impact modifier is less than 0.20.

17. The article of claim 14 wherein the composition has a flame retardancy rating of V-1 or better according to Underwriter's Laboratory Bulletin 94 entitled "Tests for Flammability of Plastic Materials, UL94" (Dec. 12, 2003 revision) at a thickness of 2 millimeters.

18. The article of claim 14 wherein the phosphinate is present in an amount of 1 to 11 weight percent and the flame retardant augment or combination of augments is present in an amount of 0.1 to 6 weight percent, based on the total weight of the composition.

19. The article of claim 14 wherein the weight ratio of flame retardant augment to phosphinate is less than or equal to 0.75.

20. The article of claim 14 wherein the total combined amount of phosphinate and flame retardant augment is less than or equal to 12 weight percent, based on the total weight of the composition.

21. The article of claim 14 wherein the composition comprises melamine polyphosphate and zinc borate and the amount of zinc borate is greater than the amount of melamine polyphosphate.

22. The article of claim 14 wherein the article is a unitary, non-enclosed article.

23. A window frame comprising the article of claim 22.

24. A furniture frame comprising the article of claim 22.

25. A room partition comprising the article of claim 22.

* * * * *